United States Patent
An et al.

(10) Patent No.: US 10,232,894 B2
(45) Date of Patent: Mar. 19, 2019

(54) VEHICLE BODY STRUCTURE USING CFRP

(71) Applicant: Hyundai Motor Company, Seoul (KR)

(72) Inventors: Yong Dok An, Anyang-si (KR); Byung Il Choi, Incheon (KR)

(73) Assignee: Hyundai Motor Company, Seoul (KR)

( * ) Notice: Subject to any disclaimer, the term of this patent is extended or adjusted under 35 U.S.C. 154(b) by 233 days.

(21) Appl. No.: 15/280,681

(22) Filed: Sep. 29, 2016

(65) Prior Publication Data

US 2017/0259856 A1 Sep. 14, 2017

(30) Foreign Application Priority Data

Mar. 8, 2016 (KR) ........................ 10-2016-0027817

(51) Int. Cl.
| | |
|---|---|
| *B62D 29/04* | (2006.01) |
| *B62D 25/04* | (2006.01) |
| *B62D 25/08* | (2006.01) |
| *B62D 27/02* | (2006.01) |

(52) U.S. Cl.
CPC .......... *B62D 29/043* (2013.01); *B62D 25/04* (2013.01); *B62D 25/081* (2013.01); *B62D 27/023* (2013.01); *B60Y 2304/03* (2013.01); *B62D 25/088* (2013.01)

(58) Field of Classification Search
CPC .... B62D 29/043; B62D 25/04; B62D 25/081; B62D 27/023
USPC ......................................................... 296/192
See application file for complete search history.

(56) References Cited

U.S. PATENT DOCUMENTS

| | | | | |
|---|---|---|---|---|
| 6,209,950 B1* | 4/2001 | Hanyu | .................. | B62D 25/04 296/203.02 |
| 7,140,674 B2* | 11/2006 | Miyoshi | .................. | B62D 25/04 296/203.03 |
| 2003/0001411 A1* | 1/2003 | Gedritis | .............. | B29C 45/1639 296/192 |
| 2016/0194033 A1* | 7/2016 | Kondo | .................. | B62D 25/04 296/192 |

FOREIGN PATENT DOCUMENTS

| | | |
|---|---|---|
| JP | 2-95954 A | 4/1990 |
| JP | 10-287272 A | 10/1998 |
| JP | 2005-271350 A | 10/2005 |
| KR | 10-2005-0035007 A | 4/2005 |
| KR | 10-2008-0052754 A | 6/2008 |

* cited by examiner

*Primary Examiner* — Joseph D. Pape
(74) *Attorney, Agent, or Firm* — Morgan, Lewis & Bockius LLP

(57) ABSTRACT

A vehicle body structure using carbon fiber reinforced plastics (CFRP) may include a cowl member extending along a width direction of a vehicle, a front pillar extending along a height direction of the vehicle, and a cowl side member of which an inner side is coupled to a front end of the cowl member and an outer side is coupled to the front pillar member.

10 Claims, 3 Drawing Sheets

VEHICLE BODY STRUCTURE USING CFRP

CROSS-REFERENCE TO RELATED APPLICATION

The present application claims priority to Korean Patent Application No. 10-2016-0027817, filed Mar. 8, 2016, the entire contents of which is incorporated herein for all purposes by this reference.

BACKGROUND OF THE INVENTION

Field of the Invention

The present invention relates to a vehicle body structure using carbon fiber reinforced plastics (CFRP). More particularly, to a vehicle structure using CFRP, in which a cowl cross member and a front pillar are manufactured using a braiding method and then connected by a cowl side member.

Description of Related Art

In general, a cowl member forming a vehicle body extends along a width direction of a vehicle and is mounted to an upper portion of a dash panel that partitions a passenger room and an engine compartment so as to support a front window.

In addition, pillars forming the vehicle body extend along a height direction of the vehicle and serve as supports of the vehicle body, and include a front pillar (or, A pillar) disposed in a front along a length direction of the vehicle, a center pillar (or, B pillar) disposed in a center of the vehicle, and a rear pillar (or, C pillar) disposed at a rear of the vehicle.

Conventionally, the above-stated cowls and pillars are typically made of steel plates in order to assure rigidity.

Recently, a vehicle body has tended to be manufactured using light-weighted and high-rigid CFRP for weight reduction of a vehicle, thereby reducing fuel consumption, and a vehicle body structure having a closed section has been manufactured with a CFRP material using a braiding method and applied.

As described, a front pillar and a cowl member manufactured with a CFRP material using the braiding method are rigidly connected with each other to thereby reinforce structural rigidity of the vehicle body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle body structure of which a cowl upper cross member and a front pillar member are manufactured using a carbon fiber reinforced plastics (CFRP) material and integrally connected with a cowl side member to enhance horizontal directional rigidity, and the cowl side member is connected to a front vehicle body to enhance structural rigidity of the vehicle body.

According to various aspects of the present invention, a vehicle body structure using carbon fiber reinforced plastics (CFRP) may include a cowl member extending along a width direction of a vehicle, a front pillar extending along a height direction of the vehicle, and a cowl side member of which an inner side is coupled to a front end of the cowl member and an outer side is coupled to the front pillar member.

The cowl member may include a cowl panel extended along the width direction of the vehicle and bent in multiple stages, a cowl lower cross member disposed below the cowl panel and extending along the width direction of the vehicle, and a cowl upper cross member disposed above the cowl panel and extended along the width direction of the vehicle.

The cowl upper cross member may be formed through a braiding method using a CFRP material.

The cowl upper cross member may include a polygonal closed section that extends along a length direction thereof.

The front pillar member may include a front pillar extending along a height direction of the vehicle and continuously extending rearward along a length direction of the vehicle, and a front pillar reinforcement member disposed further frontally than the front pillar and extending along the height direction of the vehicle.

The front pillar and the front pillar reinforcement member may each be formed through a braiding method using a CFRP material.

The front pillar and the front pillar reinforcement member may have quadrangular or polygonal closed sections extending along the length direction thereof.

The cowl side member may include a cowl side inner member having an inner side to which end portions of the cowl panel, the cowl lower cross member, and the cowl upper cross member are coupled and an outer side to which the front pillar and the front pillar reinforcement member are coupled, and a cowl side outer member having an inner side to which the front pillar and the front pillar reinforcement member are coupled.

A hood hinge mounting portion may be provided in the cowl side outer member.

A rear end portion of a front vehicle body member may be integrally coupled to a front side of the cowl side outer member, and a front shock absorber mounting bracket may be attached to the front vehicle body member.

The cowl panel may be attached to a bottom side of the cowl upper cross member, the cowl lower cross member may be attached to a bottom side of the cowl panel, and the cowl panel and the cowl lower cross member may be attached together to an upper portion of a dash panel.

According to various embodiments of the present invention, the cowl member may be formed of the cowl panel extended along the width direction of the vehicle, the cowl lower cross member provided below the cowl panel, and the cowl upper cross member manufactured through the braiding method using the CFRP material and disposed above the cowl panel, and accordingly, horizontal directional rigidity of the vehicle can be enhanced by applying the double cross member structure.

Lateral ends of the cowl member are coupled to the front pillar member through the cowl side member and the front pillar member is manufactured through the braiding method using a CFRP material such that horizontal connection rigidity of the cowl member and the front pillar member may be enhanced.

The cowl side member is formed of the cowl side inner member and the cowl side outer member, and the cowl side outer member is provided with a hood hinge mounting portion such that a hood can be stably supported through the hood hinge mounting portion.

The cowl side outer member is connected with a front vehicle body so that connection rigidity between the front vehicle body, the front pillar, and the cowl member may be enhanced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
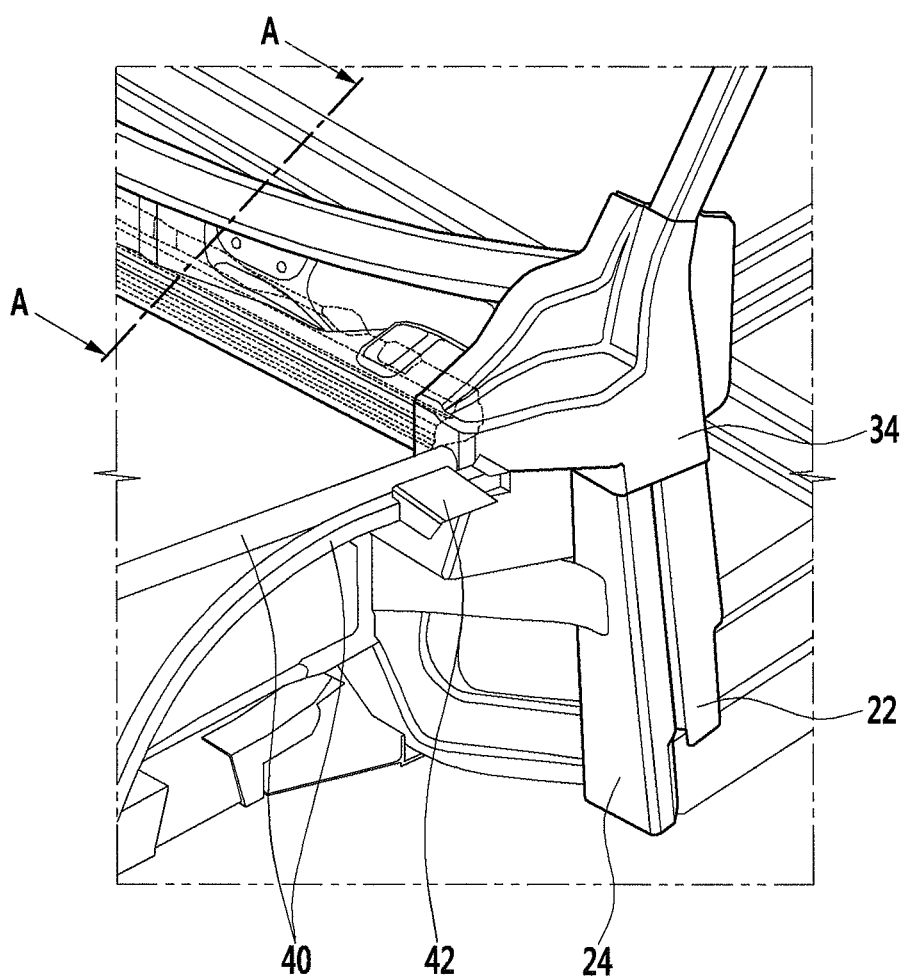
FIG. 1 is a perspective view of a vehicle body using carbon fiber reinforced plastics (CFRP) according to various embodiments of the present invention.
Figure 2:
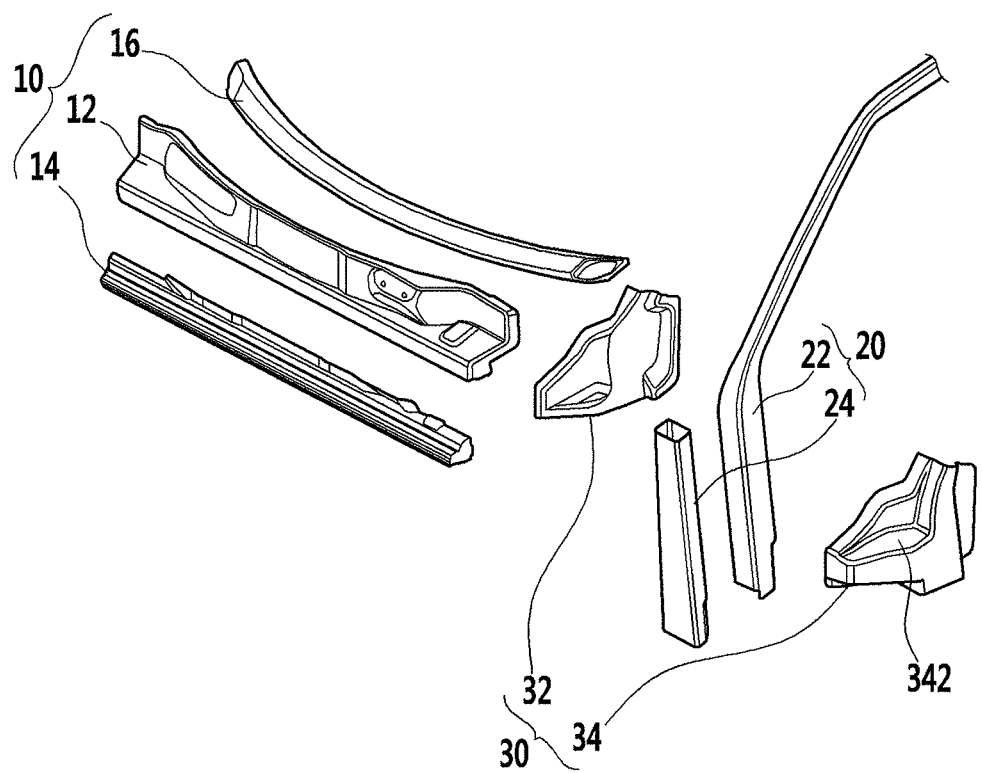
FIG. 2 is an exploded perspective view of the vehicle body using CFRP according to various embodiments of the present invention.
Figure 3:
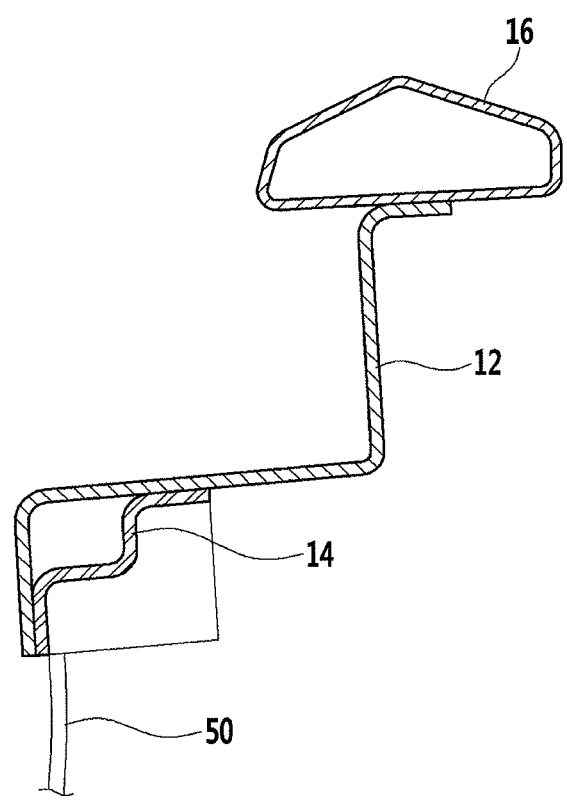
FIG. 3 is a cross-sectional view of FIG. 1, taken along the line A-A.

Referring to FIG. 1 to FIG. 3, a vehicle body structure using carbon fiber reinforced plastics (CFRP) according to various embodiments of the present invention may include a cowl member 10 extending along a width direction of a vehicle, a front pillar member 20 extending along a height direction of the vehicle, and a cowl side member 30 connecting the cowl member 10 and the front pillar member 20.

The cowl member 10 extends along a width direction of the vehicle, and may include a cowl panel 12 bent in several stages, a cowl lower cross member 14 disposed below the cowl panel 12 and extending along the width direction of the vehicle, and a cowl upper cross member 16 disposed above the cowl panel 12 and extending along the width direction of the vehicle.

The cowl upper cross member 16 may be manufactured with a CFRP material using a braiding method.

The cowl upper cross member 16 may have a structure in which a polygonal closed section extends along a length direction thereof.

Since the cowl member 10 includes double cross members 14 and 16 extended along the width direction of the vehicle, rigidity of the vehicle in the width direction can be reinforced.

The front pillar member 20 may include a front pillar 22 extended along a width direction of the vehicle and then continuously extended rearward of the length direction of the vehicle, and a front pillar reinforcement member 24 disposed more frontally than the front pillar 22 and extended along the width direction of the vehicle.

The front pillar 22 and the front pillar reinforcement member 24 may be respectively manufactured with a CFRP material.

The front pillar 22 and the front pillar reinforcement member 24 may have a structure in which a quadrangular or polygonal closed section is extended along a length direction thereof.

As described, the front pillar member 20 is formed of a double structure of the front pillar 22 and the front pillar reinforcement member 24 such that rigidity can be enhanced, and the closed sections of the front pillar 22 and the front pillar reinforcement member 24 are formed through the braiding method using the CFRP material such that the closed sections are formed in a continuous structure, thereby achieving low weight and a highly rigid structure.

The cowl side member 30 is coupled to inner sides of front end portions of the cowl panel 12, the cowl lower cross member 14, and may include a cowl side inner member 32 and a cowl side outer member 34. Thus, the front pillar 22 and the front pillar reinforcement member 24 are coupled to an outer side of the cowl side inner member 32 and the front pillar 22 and the front pillar reinforcement member 24 are coupled to an inner side of the cowl side outer member 34.

As the cowl member 10 is coupled to the front pillar member 20 through the cowl side member 30, connection rigidity between the two members may be enhanced.

A hood hinge mounting portion 342 that is substantially parallel with the cowl side outer member 34 is formed in the cowl side outer member 34 and thus a hood hinge can be stably mounted to the cowl side outer member 34, and accordingly, a stable support structure of a hood through the cowl side outer member 34 can be realized.

Referring to FIG. 1 and FIG. 2, a rear end portion of a front vehicle body member 40 is integrally coupled to a front side of the cowl side outer member 34 and a front shock absorber mounting bracket 42 is attached to the front vehicle body member 40 such that the front vehicle body member 40, the front pillar member 20, and the cowl member 10 are connected with each other through the cowl side outer member 34, and accordingly, a load input through the front shock absorber mounting bracket 42 and the front vehicle body member 40 can be stably supported.

Referring to FIG. 3, the cowl panel 12 is attached to one bottom side of the cowl upper cross member 16, the cowl lower cross member 14 is attached to another bottom side of the cowl panel 12, and the cowl panel 12 and the cowl lower cross member 14 are attached together to an upper portion of a dash panel 50 such that rigidity can be enhanced by the double cross members 14 and 16 and a degree of layout freedom may be improved.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body structure using carbon fiber reinforced plastics (CFRP), the vehicle body structure comprising:
   a cowl member extending along a width direction of a vehicle;
   a front pillar member extending along a height direction of the vehicle; and
   a cowl side member of which an inner side is coupled to a front end of the cowl member and an outer side is coupled to the front pillar member,
   wherein the cowl member comprises:
      a cowl panel extending along the width direction of the vehicle and bent in a plurality of stages;
      a cowl lower cross member disposed below the cowl panel and extending along the width direction of the vehicle; and
      a cowl upper cross member disposed above the cowl panel and extending along the width direction of the vehicle.

2. The vehicle body structure using the CFRP of claim 1, wherein the cowl upper cross member is formed through braiding using a CFR P material.

3. The vehicle body structure using the CFRP of claim 2, wherein the cowl upper cross member includes a polygonal closed section that extends along a length direction thereof.

4. The vehicle body structure using the CFRP of claim 1, wherein the front pillar member comprises:
   a front pillar extending along the height direction of the vehicle and continuously extending rearward along a length direction of the vehicle; and
   a front pillar reinforcement member disposed further frontally than the front pillar and extending along the height direction of the vehicle.

5. The vehicle body structure using the CFRP of claim 4, wherein the front pillar and the front pillar reinforcement member are each formed through a braiding method using the CFRP material.

6. The vehicle body structure using the CFRP of claim 4, wherein the front pillar and the front pillar reinforcement member have quadrangular or polygonal closed sections extending along the length direction thereof.

7. The vehicle body structure using the CFRP of claim 4, wherein the cowl side member comprises:
   a cowl side inner member having an inner side to which end portions of the cowl panel, the cowl lower cross member, and the cowl upper cross member are coupled and an outer side to which the front pillar and the front pillar reinforcement member are coupled; and
   a cowl side outer member having an inner side to which the front pillar and the front pillar reinforcement member are coupled.

8. The vehicle body structure using the CFRP of claim 7, wherein a hood hinge mounting portion is provided in the cowl side outer member.

9. The vehicle body structure using the CFRP of claim 7, wherein a rear end portion of a front vehicle body member is integrally coupled to a front side of the cowl side outer member, and a front shock absorber mounting bracket is attached to the front vehicle body member.

10. The vehicle body structure using the CFRP of claim 1, wherein the cowl panel is attached to a bottom side of the cowl upper cross member, the cowl lower cross member is attached to a bottom side of the cowl panel, and the cowl panel and the cowl lower cross member are attached together to an upper portion of a dash panel.

* * * * *